United States Patent
Liu et al.

(10) Patent No.: US 9,715,267 B2
(45) Date of Patent: Jul. 25, 2017

(54) METHOD FOR SWITCHING OPERATING SYSTEMS AND ELECTRONIC APPARATUS

(71) Applicants: Chih-Chien Liu, Taipei (TW); Chun-Sheng Chen, Taipei (TW)

(72) Inventors: Chih-Chien Liu, Taipei (TW); Chun-Sheng Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 232 days.

(21) Appl. No.: 14/228,269

(22) Filed: Mar. 28, 2014

(65) Prior Publication Data

US 2015/0198999 A1   Jul. 16, 2015

(30) Foreign Application Priority Data

Jan. 14, 2014 (TW) .............................. 103101272 A

(51) Int. Cl.
  G06F 1/32 (2006.01)
  G06F 9/44 (2006.01)

(52) U.S. Cl.
  CPC ............ *G06F 1/3234* (2013.01); *G06F 9/441* (2013.01); *G06F 9/4406* (2013.01); *G06F 9/4418* (2013.01); *Y02B 60/186* (2013.01)

(58) Field of Classification Search
  CPC ... G06F 9/44; G06F 9/441; G06F 9/48; G06F 9/4406; G06F 1/32; G06F 15/177; G06F 1/3234; G06F 9/4418; Y02B 60/142; Y02B 60/186
  See application file for complete search history.

(56) References Cited

U.S. PATENT DOCUMENTS

| | | | | |
|---|---|---|---|---|
| 7,409,536 B2* | 8/2008 | Guo | ...... | G06F 9/4843 713/1 |
| 7,529,921 B2* | 5/2009 | Stein | ...... | G06F 9/441 713/1 |
| 8,499,174 B2* | 7/2013 | Lai | ...... | G06F 1/3203 713/300 |
| 8,874,889 B2* | 10/2014 | Teng | ...... | G06F 9/441 713/1 |
| 2007/0055860 A1* | 3/2007 | Wang | ...... | G06F 1/3203 713/2 |
| 2010/0064158 A1 | 3/2010 | Lai et al. | | |
| 2012/0191961 A1* | 7/2012 | Wu | ...... | G06F 1/3275 713/2 |
| 2012/0226925 A1* | 9/2012 | Wang | ...... | G06F 9/485 713/321 |
| 2015/0113257 A1* | 4/2015 | Lewis | ...... | G06F 9/4806 713/1 |

OTHER PUBLICATIONS

"Office Action of Taiwan Counterpart Application," issued on Feb. 22, 2016, p. 1-p. 9.

* cited by examiner

*Primary Examiner* — Fahmida Rahman
(74) *Attorney, Agent, or Firm* — Jianq Chyun IP Office

(57) ABSTRACT

A method for switching operating systems and an electronic apparatus are provided. A first operating system (OS) is notified to enter a power saving mode when a switching signal is received in case of running the first OS. In the power saving mode, a first running data of the first OS is stored to a first dump area of a storage unit from a system memory, a second OS is loaded to the system memory such that the second OS enters a normal operating mode.

6 Claims, 2 Drawing Sheets

METHOD FOR SWITCHING OPERATING SYSTEMS AND ELECTRONIC APPARATUS

CROSS-REFERENCE TO RELATED APPLICATION

This application claims the priority benefit of Taiwan application serial no. 103101272, filed on Jan. 14, 2014. The entirety of the above-mentioned patent application is hereby incorporated by reference herein and made a part of this specification.

BACKGROUND

Field of the Disclosure

The disclosure is directed to a method for using multiple OSs and more particularly, to a method for switching operating systems and an electronic apparatus.

Description of Related Art

Along with the development of technologies, electronic apparatuses in the market have been developed to offer different functions in order to satisfy different user demands. According to different usage requirements, a user may install multiple operating systems (OS) in an electronic apparatus. For example, both the Mac OS and the MS Windows OS may be installed in an electronic apparatus.

Generally speaking, there are two methods to switch between two OSs. One is to enter another OS by re-booting the electronic apparatus, and the other is to switch between two OSs by using a virtualization technology. For the user, entering another OS by rebooting is not a convenient way. Although switching between two OSs by using the virtualization technology can save the time for re-booting, starting one OS while the other OS is running would leads to worse system performance.

SUMMARY

The disclosure provides a method for switching operating systems and an electronic apparatus providing capable of quickly switching operating systems and causing no burden to system resources.

The disclosure is directed to a method for switching operating systems applicable to an electronic apparatus. The method includes loading a first operation system (OS) to a system memory to run the first OS, in case of running the first OS, notifying the first OS to enter a power saving mode when a switching signal is received, storing first running data of the first OS from a system memory to a first dump area of a storage unit in the power saving mode and loading a second OS to the system memory, such that the second OS enters a normal operating mode.

In an embodiment of the disclosure, the step of loading the first OS to the system memory includes checking whether the first running data of the first OS exists in the first dump area of the storage unit, dumping the first running data from the first dump area to the system memory and making the first OS enter the normal operating mode if the first running data of the first OS exists in the first dump area and loading the first OS from a first partition of the storage unit to the system memory, such that the first OS enters the normal operating mode if the first running data of the first OS does not exist in the first dump area.

In an embodiment of the disclosure, the step of loading the second OS to the system memory includes checking whether second running data of the second OS exists in a second dump area of the storage unit, dumping the second running data from the second dump area to the system memory and switching the second OS to the normal operating mode if the second running data of the second OS exists in the second dump area and loading the second OS from a second partition of the storage unit to the system memory, such that the second OS enters the normal operating mode if the second running data of the second OS does not exist in the second dump area.

In an embodiment of the disclosure, the method further includes executing a boot procedure by means of a boot firmware and loading the first OS to the system memory by means of the boot firmware.

In an embodiment of the disclosure, after the step of loading the first OS to the system memory, the method further includes in case of running the first OS, starting a monitoring program to detect whether the switching signal is received and notifying the first OS by the monitoring program when detecting that the switching signal is received, such that the first OS enters the power saving mode.

In an embodiment of the disclosure, after the step of notifying the first OS to enter the power saving mode, the method further includes when the first OS enters the power saving mode, sending a request signal to a system chipset by the first OS to request the system chipset to enter the power saving mode, when the system chipset enters the power saving mode, storing the first running data of the first OS from the system memory to the first dump area of the storage unit by means of the boot firmware and loading the second OS to the system memory by means of the boot firmware.

In an embodiment of the disclosure, in case of running the first OS, the method includes detecting by an embedded controller whether the switching signal is received.

In an embodiment of the disclosure, the system memory is a random access memory (RAM), and the storage unit is a non-volatile storage unit.

The disclosure is directed to an electronic apparatus, including a system memory, a storage unit, a boot firmware unit and a system chipset. The system chipset is coupled to the system memory, the storage unit and the boot firmware unit. The storage unit includes a first partition having a first OS, a second partition having a second OS, a first dump area and a second dump area. When the second OS is switched to from the first OS, first running data of the first OS is stored from the system memory to the first dump area, and when the first OS is switched to from the second OS, second running data of the second OS is stored from the system memory to the second dump area. The system chipset loads the first OS to the system memory by means of the boot firmware to run the first OS. In case of running the first OS, when a monitoring program of the first OS detects that a switching signal is received, the monitoring program notifies the first OS to enter a power saving mode. In the power saving mode, the first running data of the first OS is stored from the system memory to the first dump area by means of the boot firmware. When the second running data does not exist in the second dump area, the second OS is loaded from the second partition to the system memory by means of the boot firmware, such that the second OS enters a normal operating mode. When the second running data exists in the second dump area, the second running data of the second OS is loaded from the second dump area to the system memory be means of the boot firmware, such that the second OS enters the normal operating mode.

To sum up, in the disclosure, the OSs can be quickly switched, and due to the system memory only storing the running data of the currently running OS, the OS can access the complete system memory when running, without causing any burden to the system memory.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Generally, an electronic apparatus where multiple OSs (OS) are installed has difficulty in having both usage convenience and system performance at the same time. The disclosure provides a method for switching operating systems and an electronic apparatus capable of quickly switching operating systems without causing any burden to system resources. In order to make the content of the disclosure clearer, the following embodiments are illustrated as examples that can be truly implemented by the disclosure.

Figure 1:
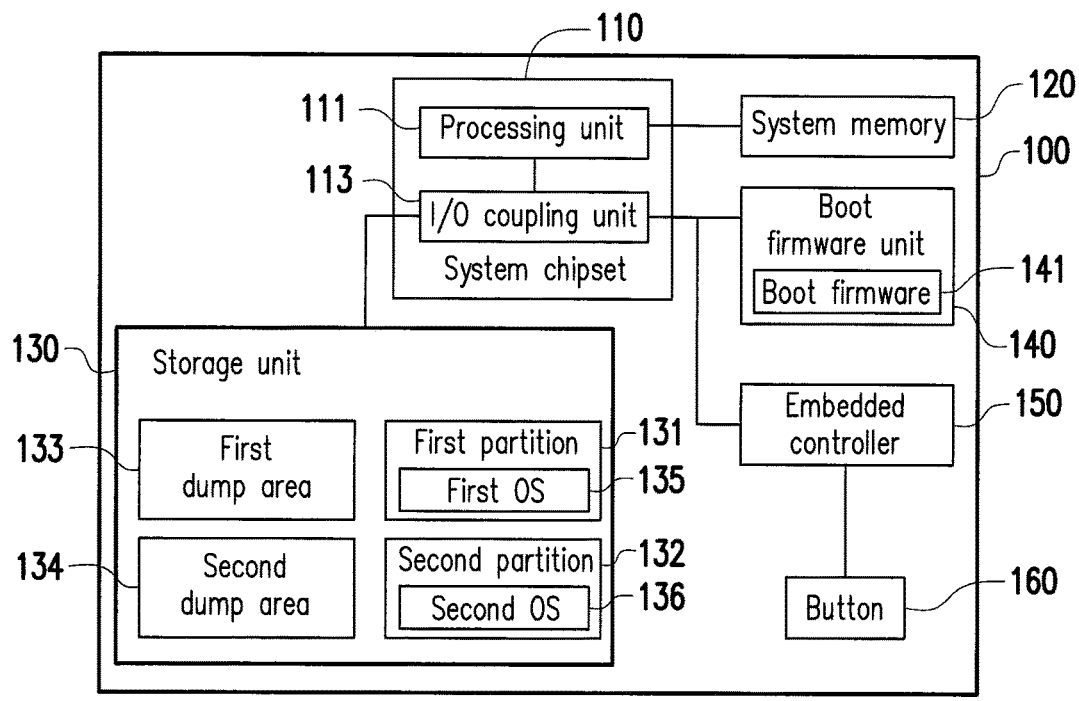
FIG. 1 is a block diagram of an electronic apparatus according to an embodiment of the disclosure.

FIG. 1 is a block diagram of an electronic apparatus according to an embodiment of the disclosure. With reference to FIG. 1, an electronic apparatus 100 includes a system chipset 110, a system memory 120, a storage unit 130, a boot firmware unit 140, an embedded controller 150 and a button 160. The system chipset 110 is coupled to the system memory 120, the storage unit 130, the boot firmware unit 140 and the embedded controller 150.

The system chipset 110 includes a processing unit 111 and an input and output (I/O) coupling unit 113. The processing unit 111 is, for example, a central processing unit (CPU), a microprocessor, a digital signal processor (DSP) or a programmable controller. In the present embodiment, the processing unit 111 is coupled to the system memory 120. The I/O coupling unit 113 is coupled to the boot firmware unit 140 and the embedded controller 150.

The system memory 120 is, for example, a random access memory (RAM) which is a master memory exchanging data directly with the processing unit 111. The boot firmware unit 140 is, for example, a read only memory (ROM), including a boot firmware 141. The boot firmware 141 provides, for example, a basic hardware initialization code and a periphery control code. The boot firmware 141 is, for example, basic input output system (BIOS).

The storage unit 130 is, for example, a non-volatile storage unit, such as a solid state disk (SDD), a hard disk drive (HDD), a flash memory or the like. The storage unit 130 includes a first partition 131, a second partition 132, a first dump area 133 and a second dump area 134. The first partition 131 contains a first OS 135. The second partition 132 contains a second OS 136. The first dump area 133 and the second dump area 134 serves the currently running OS to store running data thereof during the switching of the OSs. The first dump area 133 serves to store first running data of the first OS 135, and the second dump area 134 serves to store second running data of the second OS 136.

In the present embodiment, each of the first OS 135 and the second OS 136 includes a monitoring program, by which whether a switching signal (serving as a signal for OS switching) is received is detected. When the switching signal is received, the monitoring program notifies the running OS (e.g., the first OS 135 or the second OS 136) to enter a power saving mode. When entering the power saving mode, the running OS sends a request signal to the system chipset 110 to request the system chipset 110 to enter the power saving mode, such that the control of the electronic apparatus 100 is transferred from the OS to the boot firmware 141. The power saving mode one of modes S1 through S3 regulated in the advanced configuration and power interface (ACPI) standard. In the power saving mode, the OS switching is performed by means of the boot firmware 141.

In the present embodiment, a physical button 160 is disposed in the electronic apparatus 100 to generate the switching signal. For instance, the button 160 is solely disposed or composed of a single key or combined keys on a keyboard. The button 160 is coupled to the embedded controller 150 to detect whether the switching signal is received by using the embedded controller. That is, the embedded controller 150 detects whether the button 160 is enabled to generate the switching signal. Alternatively, the button 160 may also be coupled to the I/O coupling unit 113 of the system chipset 110, such that a user may use the button 160 to select whether to switch the OS. However, the aforementioned case is merely an illustration for example, but the disclosure is not limited thereto. In other embodiments, the switching signal may also be generated by software, such as displaying a virtual button on a screen (not shown) for the user to choose whether to switch the OS.

Figure 2:
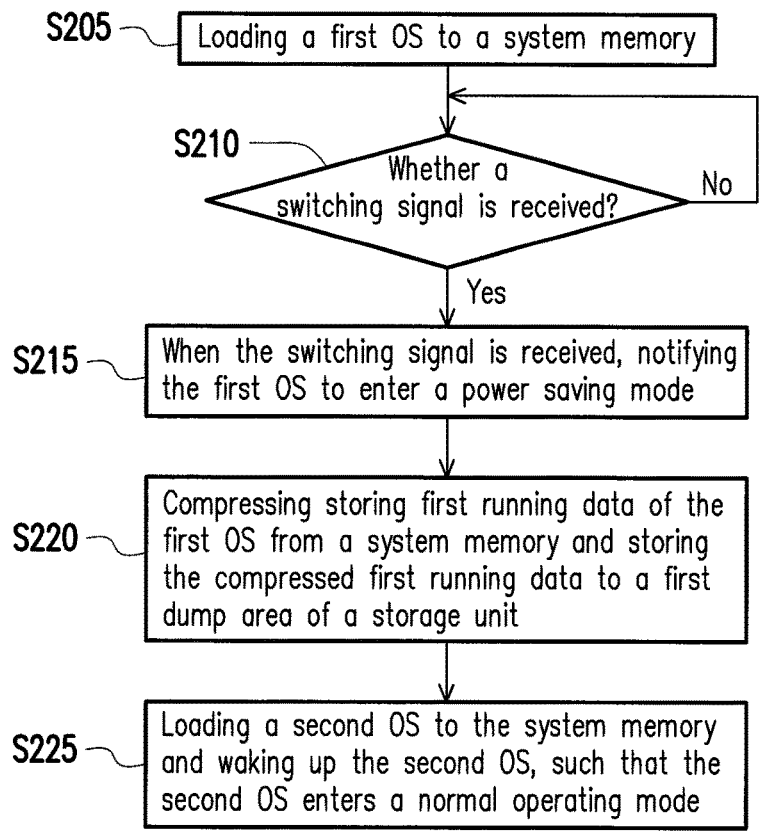
FIG. 2 is a flowchart of a method for switching operating systems according to an embodiment of the disclosure.

Each step of a method for switching operating systems together with the electronic apparatus 100 will be described below. FIG. 2 is a flowchart of a method for switching operating systems according to an embodiment of the disclosure. For descriptive convenience, in the present embodiment, the first OS 135 is first loaded and serving as the currently running OS, while the second OS 136 serves as the OS to be switched to.

With reference to FIG. 2, in step S205, the boot firmware 141 loads the first OS 135 to the system memory 120. For instance, during the boot procedure, the boot firmware 141 executes the boot procedure and loads the first OS 135 from the first partition 131 to the system memory 120 based on the OS (e.g., the first OS 135) which is preset to be started.

Then, in step S210, in case of running the first OS 135, the monitoring program detects whether the switching signal is received. To be more specific, when running, the first OS 135 automatically starting the monitoring program (such as a resident program or a service procedure). With the monitoring program, whether the switching signal is received may be detected, and when no switching signal is received, the first OS 135 keeps running.

When the switching signal is received, in step S215, the monitoring program notifies the first OS 135 to enter the power saving mode. For instance, the monitoring program notifies the currently running first OS 135 to enter the power saving mode, after receiving the notification, the first OS 135 sends a request signal to the system chipset 110 to request the system chipset 110 to enter the power saving mode. After entering the power saving mode, the system chipset 110 sends an interruption signal and transfers the control of the electronic apparatus 100 to the boot firmware 141 (e.g., the BIOS).

Thereafter, in step S220, the boot firmware 141 stores the first running data of the first OS 135 from the system memory 120 to the first dump area 133 of the storage unit 130. For instance, in the power saving mode, the boot firmware 141 compresses the first running data in the system memory 120 and then stores the compressed first running data to the first dump area 133.

Afterwards, in step S225, the boot firmware 141 decompresses and loads the second OS 136 to the system memory 120 and wakes up the second OS, such that the second OS enters a normal operating mode. In the present embodiment, the boot firmware 141 may first check whether the second running data of the second OS 136 exists in the second dump area 134. If the second running data exists in the second dump area 134, the boot firmware 141 loads the second running data from the second dump area 134 to the system memory 120. If the second running data does not exists in the second dump area 134, the boot firmware 141 loads the second OS 136 from the second partition 132 to the system memory 120 according to the normal boot procedure.

Based on the above, the electronic apparatus 100 has at least two OSs (i.e., the first OS 135 and the second OS 136), and both the first OS 135 and second OS 136 are installed with the monitoring programs. When the user desires to perform OS switching, he/she uses the monitoring program to notify the running first OS 135 to enter the power saving mode, such that the boot firmware 141 compresses and dump the data of the running first OS 135 from the system memory 120 to the storage unit 130. Thereafter, whether there is second running data of the second OS 136 to be switched to in the storage unit 130 is checked. If yes, after a file corresponding to second running data is opened from the storage unit 130, the second running data is decompressed and written into the system memory 120, and the second OS is switched to the normal operating mode for operation. Thereby, the system memory 120 merely stores the running data belonging to the running OS, and thus, the running OS can access the complete system memory 120.

However, in the electronic apparatus 100, multiple OSs (which are not limited to being two) may also be installed. Meanwhile, partitions and sump areas corresponding to the number of the OSs to be installed are partitioned in the storage unit 130. For instance, if N OSs are to be installed, N partitions (the 1st through the N$^{th}$ partitions) and N dump areas (the 1st through the N$^{th}$ dump areas) are partitioned in the storage unit 130. In a scenario where multiple OSs are installed, when the switching signal is received (e.g., in step S210), the user is further inquired about which OS is he/she desire to switch to.

Another embodiment is illustrated in detail as follows.

Figure 3:
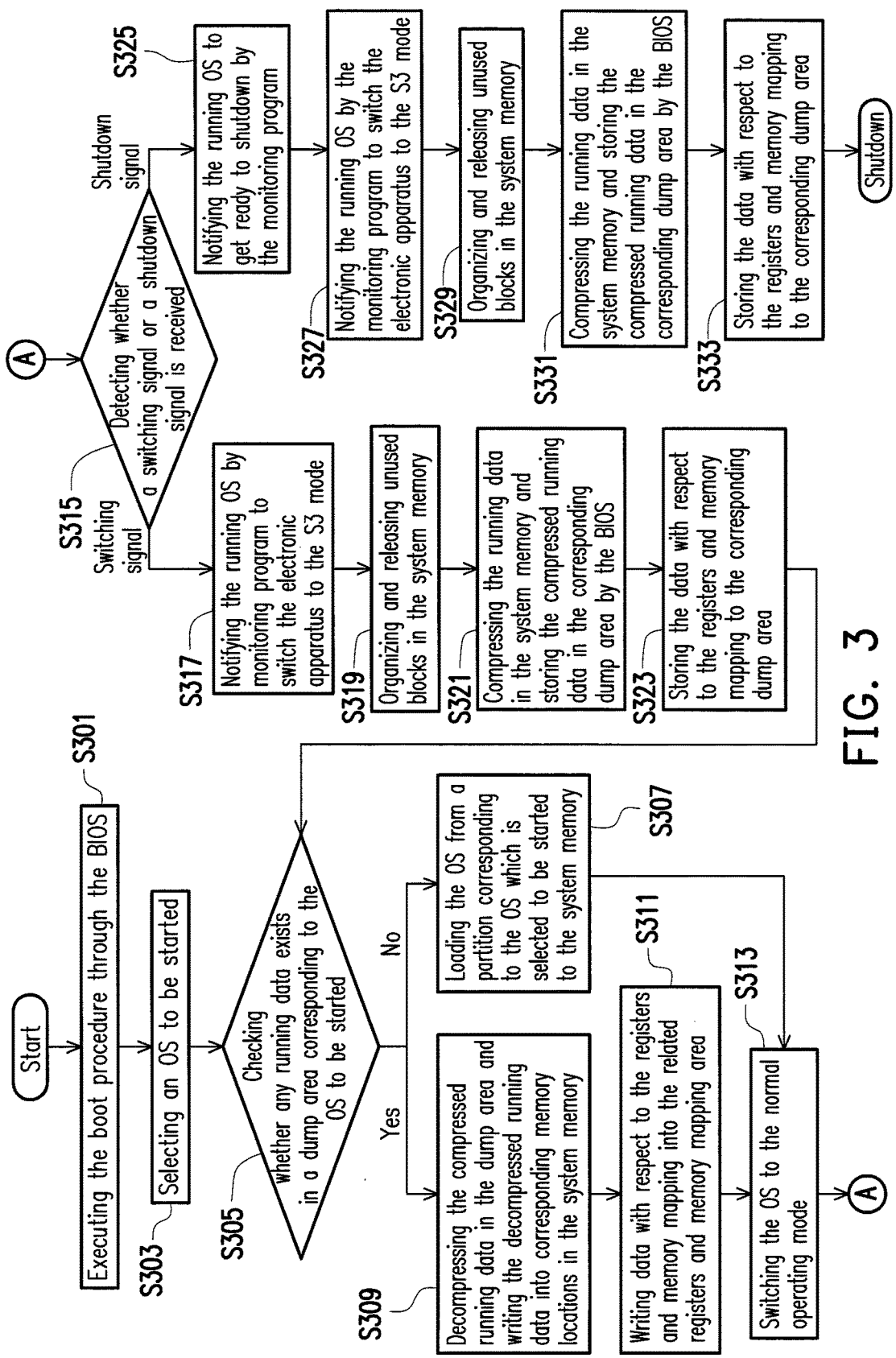
FIG. 3 is a flowchart of a method for switching operating systems according to another embodiment of the disclosure.

FIG. 3 is a flowchart of a method for switching operating systems according to another embodiment of the disclosure. In the present embodiment, the boot firmware 141 is BIOS, the power saving mode is the S3 mode of the ACPI standard, and the normal operating mode is the S0 mode of the ACPI standard, for example, and the method is described with reference to the electronic apparatus 100 illustrated in FIG. 1.

After a power button of the electronic apparatus 100 is pressed, the electronic apparatus 100 is supplied with power from a power supply (not shown), such that the processing unit 111 executes the boot procedure through the BIOS (i.e., the boot firmware 141), as shown in step S301. For instance, the BIOS executes a power on self test (POST) procedure, initiates peripherals, such as the system memory 120, and related registers and tests whether a normal operation is available.

Then, in step S303, the BIOS selects an OS to be started, e.g., selecting the OS to be started based on a boot setting (or a user selection). Thereafter, in step S305, the BIOS checks whether any running data exists in a dump area corresponding to the OS to be started. In this case, if the electronic apparatus 100 is booted for the first time, no earlier running data of the OS will exists in the dump area. Thus, in step S307, the electronic apparatus 100 is booted according to the ordinary boot procedure, and the BIOS loads the OS from a partition corresponding to the OS which is selected to be started to the system memory 120. For instance, if it is the first time for the first OS 135 to be started, the BIOS loads the first OS 135 from the first partition 131 to the system memory 120, and then, in step S313, the first OS 135 is switched to the normal operating mode for operation.

Moreover, if in step S305, it is checked that the running data of the OS to be started exists in the dump area, step S309 is performed, and the BIOS decompresses the compressed running data in the dump area and writes the decompressed running data into corresponding memory locations in the system memory 120. Meanwhile, in step S311, the BIOS writes data with respect to the registers and memory mapping into the related registers and memory mapping area. The aforementioned registers include, for example, a register of the processing unit 111 (e.g., a CPU) or a register of a south bridge/north bridge system chipset (not shown). Thereafter, in step S313, the OS is switched to the normal operating mode for operation. For example, if the first OS 135 to be started has been previously started, after checking that the first running data exists in the first dump area 133, the BIOS loads the first running data from the first dump area 133 to the system memory 120, such that the first OS 135 is switched to the normal operating mode.

Following node A in FIG. 3, in step S315, the monitoring program detects whether a switching signal or a shutdown signal is received. That is, when the OS is started, the monitoring program is automatically started. When determining that the switching signal is received, in step S317, the monitoring program notifies the running OS to switch the electronic apparatus 100 to the S3 mode. Then, in step S319, the BIOS organizes and releases unused blocks in the system memory 120. Meanwhile, in step S321, the BIOS compresses the running data in the system memory 120 and stores the compressed running data in the corresponding dump area. Further, in step S323, the BIOS also stores the data with respect to the registers and memory mapping to the corresponding dump area. Thereafter, step S305 is performed to check whether any running data of the OS to be started exists in the corresponding dump area. If yes, steps S309 through S313 are performed, while if no, steps S307 and S313 are performed.

For instance, when the switching signal is received in a scenario that the first OS 135 is running in the electronic apparatus 100, the monitoring program notifies the first OS 135 to switch the electronic apparatus 100 to the S3 mode, and the control of the electronic apparatus 100 is interrupted and transferred from the first OS 135 to the BIOS. Then, the BIOS compresses the first running data in the system memory 120 and stores the compressed running data together with the data of the related register and the memory mapping data in the first dump area 133. Thereafter, the BIOS checks whether the second running data exists in the second dump area 134, and if yes, steps S309 through S313 are performed, while if no, steps S307 and S313 are performed.

Further, if a shutdown signal is received in step S315, in step S325, the monitoring program notifies the running OS to get ready to shutdown. Then, before shutdown, steps S327 through S333 may be further performed. In the present embodiment, steps S327 through S333 and steps S317 through S323 are the same, and the related description may refer to the content with respect to steps S317 through S323. In the present embodiment, before shutdown, the BIOS may stores the running data of the running OS in the corresponding dump area, and thereby, in the boot procedure next time, when it is checked that the running data exists in the corresponding dump area, the running data is directly loaded to the system memory 120 to return to the usage status before the previous shutdown.

Nevertheless, in other embodiments, the first dump area 133 and the second dump area 134 may also be set as follows. In shutdown, the contents in the first dump area 133 and the second dump area 134 are cleared. Thus, in the boot procedure next time, the electronic apparatus 100 loads the default OS according to the ordinary boot procedure, and after the switching signal is received, steps S317 through S323 and steps S305 through S313 are performed.

To sum up, in the disclosure, further to the partitions being configured corresponding to the number of the installed operations systems in the storage unit, the dump area corresponding to each of the OSs is also configured. Therefore, by storing the running data of the previously running OSs in the system memory by means of the dump areas, the system memory can only store the data of the currently running OS, without temporarily storing the data of another previously running OS. Since the system memory only contains the data of the currently running OS, the OS can completely access the whole system memory, without causing any burden to the system resources. Moreover, when the previously running OS is to be switched to next time, the data thereof can be directly loaded from its corresponding dump area to the system memory, without executing the re-boot procedure, so as to achieve quick OS switching.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A method for switching operating systems, applicable to an electronic apparatus, the method comprising:
executing a boot procedure by means of a boot firmware;
loading a first operation system (OS) to a system memory by means of the boot firmware to run the first OS, wherein only the first OS and a first running data of the first OS exists in the system memory when running the first OS;
in case of running the first OS, notifying the first OS to switch the electronic apparatus to enter a power saving mode when a switching signal is received, the power saving mode is ACPI S3 mode;
in the power saving mode, storing the first running data of the first OS from the system memory to a first dump area of a storage unit; and
loading a second OS to the system memory and waking up the second OS, such that the second OS enters a normal operating mode, wherein only the second OS and a second running data of the second OS exists in the system memory when the second OS is switched to the normal operating mode,
wherein after the step of loading the first OS to the system memory, the method further comprises:
in case of running the first OS, starting a monitoring program to detect whether the switching signal is received and notifying the first OS by the monitoring program when detecting that the switching signal is received and making the first OS enter the power saving mode,
wherein after the step of notifying the first OS to enter the power saving mode, the method further comprises:
when the first OS enters the power saving mode, sending a request signal to a system chipset by the first OS to request the system chipset to enter the power saving mode;
when the system chipset enters the power saving mode, storing the first running data of the first OS from the system memory to the first dump area of the storage unit by means of the boot firmware; and
loading the second OS to the system memory by means of the boot firmware.

2. The method according to claim 1, wherein the step of loading the first OS to the system memory comprises:
checking whether the first running data of the first OS exists in the first dump area of the storage unit;
if the first running data of the first OS exists in the first dump area, dumping the first running data from the first dump area to the system memory and making the first OS enter the normal operating mode; and
if the first running data of the first OS does not exist in the first dump area, loading the first OS from a first partition of the storage unit to the system memory and making the first OS enter the normal operating mode.

3. The method according to claim 1, wherein the step of loading the second OS to the system memory comprises:
checking whether the second running data of the second OS exists in a second dump area of the storage unit;
if the second running data of the second OS exists in the second dump area, dumping the second running data from the second dump area to the system memory and switching the second OS from the power saving mode to the normal operating mode;
if the second running data of the second OS does not exist in the second dump area, loading the second OS from a second partition of the storage unit to the system memory and making the second OS enter the normal operating mode.

4. The method according to claim 1, wherein in case of running the first OS, the method comprises:
detecting by an embedded controller whether the switching signal is received.

5. The method according to claim 1, wherein the system memory is a random access memory (RAM), and the storage unit is a non-volatile storage unit.

6. An electronic apparatus, comprising:
a system memory;
a storage unit, comprising:
a first partition, comprising first OS;
a second partition, comprising second OS;
a first dump area, wherein when the second OS is switched to from the first OS, a first running data of the first OS is stored from the system memory to the first dump area; and
a second dump area, wherein when the first OS is switched to from the second OS, a second running data of the second OS is stored from the system memory to the second dump area;
a boot firmware unit, comprising a boot firmware; and
a system chipset, coupled to the system memory, the storage unit and the boot firmware unit and loading the first OS to the system memory by means of the boot firmware to run the first OS, wherein only the first OS and the first running data of the first OS exists in the system memory when running the first OS, wherein in case of running the first OS, when a monitoring program of the first OS detects that a switching signal is received, the monitoring program notifies the first OS to switch the electronic apparatus to enter a power saving mode, the power saving mode is ACPI S3 mode;

wherein the first OS sends a request signal to the system chipset to request the system chipset to enter the power saving mode, and in the power saving mode, the first running data of the first OS is stored from the system memory to the first dump area by means of the boot firmware, when the second running data does not exist in the second dump area, the second OS is loaded from the second partition to the system memory by means of the boot firmware and the second OS enters a normal operating mode, and when the second running data exists the second dump area, the second running data of the second OS is loaded from the second dump area to the system memory be means of the boot firmware, such that the second OS enters the normal operating mode, wherein only the second OS and the second running data of the second OS exists in the system memory when the second OS is switched to the normal operating mode.

* * * * *